United States Patent [19]

Pipper et al.

[11] Patent Number: 5,332,778
[45] Date of Patent: Jul. 26, 1994

[54] PRODUCTION OF REINFORCED POLYTETRAMETHYLENEADIPAMIDE

[75] Inventors: Gunter Pipper, Bad Durkheim; Walter Goetz, Ludwigshafen, both of Fed. Rep. of Germany

[73] Assignee: BASF Aktiengesellschaft, Ludwigshafen, Fed. Rep. of Germany

[21] Appl. No.: 97,909

[22] Filed: Jul. 28, 1993

Related U.S. Application Data

[63] Continuation-in-part of Ser. No. 747,327, Aug. 20, 1991, abandoned.

[30] Foreign Application Priority Data

Aug. 21, 1990 [DE]  Fed. Rep. of Germany ....... 4026404

[51] Int. Cl.⁵ .................. C08L 77/06; C08K 3/40; C08G 69/30
[52] U.S. Cl. .................. 524/606; 524/847; 524/845; 524/494; 528/335
[58] Field of Search .............. 523/527; 524/494, 606, 524/607, 845, 847; 528/335, 336

[56] References Cited

U.S. PATENT DOCUMENTS

| | | | |
|---|---|---|---|
| 2,868,757 | 1/1959 | Symons | 524/845 |
| 2,874,139 | 2/1959 | Symons | 524/845 |
| 2,875,171 | 2/1959 | Foster et al. | 524/845 |
| 2,962,466 | 11/1960 | Parnell | 524/606 |
| 3,306,875 | 2/1967 | Hay | 528/212 |
| 3,708,456 | 1/1973 | Kardos | 524/845 |
| 3,882,077 | 5/1975 | Takita et al. | 524/606 |
| 4,716,214 | 12/1987 | Gaymans et al. | 528/335 |
| 4,719,284 | 1/1988 | Nielinger et al. | 528/335 |
| 4,994,550 | 2/1991 | Pipper et al. | 524/606 |
| 5,179,164 | 1/1993 | Lausberg et al. | 525/179 |
| 5,194,514 | 3/1993 | Wan et al. | 525/371 |

FOREIGN PATENT DOCUMENTS

| | | | |
|---|---|---|---|
| 0038094 | 7/1984 | European Pat. Off. | |
| 2032588 | 11/1970 | France | 524/606 |
| 62-185746 | 8/1987 | Japan | |
| 2207330 | 9/1987 | Japan | 524/494 |

*Primary Examiner*—Paul R. Michl
*Assistant Examiner*—Peter Szekely
*Attorney, Agent, or Firm*—Keil & Weinkauf

[57] ABSTRACT

A process for producing nylon-4,6 which is filled with a reinforcing agent by mixing a reinforcing agent with nylon-4,6 in the melt comprises the steps of a) polycondensing a salt of 1,4-diaminobutane and adipic acid in the presence of excess 1,4-diaminobutane and water at polyamide-forming temperatures under superatmospheric pressure to give a precondensate having a relative viscosity $\leq 1.60$, b) polycondensing the precondensate of a) in solid phase in the presence of steam at 220°-270° C. to obtain a nylon-4,6 having a relative viscosity of from 2.0 to 2.6, c) incorporating a reinforcing agent in the melt into nylon-4,6 from stage b) to obtain a nylon-4,6 filled with a reinforcing agent, d) polycondensing said filled nylon-4,6 in solid phase in the presence of steam at 220°-270° C. to a relative viscosity of at least 3.2.

6 Claims, No Drawings

PRODUCTION OF REINFORCED POLYTETRAMETHYLENEADIPAMIDE

This application is a continuation-in-part of application Ser. No. 07/747,327, filed Aug. 20, 1991 now abandoned.

Nylon-4,6 has attracted great interest as a material on account of its high melting point. EP-B-38 094 discloses that nylon-4,6 is obtained on condensing a salt of adipic acid and 1,4-diaminobutane in aqueous solution in the presence of excess 1,4-diaminobutane and maintaining a cyclic end group content of less than 0.2 mg of equivalent per grain and then postcondensing the resulting prepolymer in solid phase in a steam-containing atmosphere. It is also stated in said reference that customary additives such as pigments or delusterants are added to the prepolymer prior to the postcondensation. No indication is provided as to how nylon-4,6 containing a relatively high level of reinforcing agents is to be produced, in particular since customary additives such as pigments or delusterants are added in amounts of below 1% by weight.

JP-A2-62/185746 discloses nylon-4,6 compositions filled with glass fibers greater than 0.5 nun, in particular from 2 to 10 mm, in length and reinforcing agents such as talc or potassium titanate.

However, the incorporation of major amounts of fillers, in particular glass fibers, in the melt of the prepolymer makes it difficult to obtain a uniform distribution, while the incorporation of fillers into nylon-4,6 of the intended final viscosity leads to severe degradation of the polymer and to short fiber lengths in the case of reinforcement with glass or carbon fibers, impairing the mechanical properties, and also leads to discolorations.

It is an object of the present invention to provide a process for producing nylon-4,6 filled with a reinforcing agent, whereby the reinforcing agent is uniformly distributed at the polymer matrix, any reduction in the mechanical properties due to severe degradation is avoided and, in particular, if glass or carbon fibers are added as reinforcing agents, an optimum fiber length is obtained.

We have found that this object is achieved by a process for preparing nylon-4,6 filled with a reinforcing agent by mixing a reinforcing agent with nylon-4,6 in the melt, comprising the steps of
  a) polycondensing a salt of 1,4-diaminobutane and adipic acid in the presence of excess 1,4-diaminobutane and water at polyamide-forming temperatures under superatmospheric pressure to give a precondensate having a relative viscosity $\leq 1.60$,
  b) polycondensing the precondensate of a) in solid phase in the presence of steam at 220°-270° C. to obtain a nylon-4,6 having a relative viscosity of from 2.0 to 2.6,
  c) incorporating a reinforcing agent in the melt into nylon-4,6 from stage b) to obtain a nylon-4,6 filled with a reinforcing agent,
  d) polycondensing said filled nylon-4,6 from stage c) in solid phase in the presence of steam at 220°-270° C. to a relative viscosity of at least 3.2, wherein said relative viscosity is measured with 1% by weight solutions of the corresponding polyamide in 96% by weight of sulfuric acid at 25° C.

The novel process has the advantage of producing a nylon-4,6, filled with a reinforcing agent, of consistently high mechanical quality while at the same time minimizing discoloration. A further advantage of the novel process is that even large amounts of reinforcing agent are easy to disperse in the nylon-4,6 and, what is more, additions of glass fiber are distributed in optimum length.

In stage a), a salt of 1,4-diaminobutane and adipic acid is polycondensed in the presence of excess 1,4-diaminobutane and water at a polyamide-forming temperature under superatmospheric pressure to give a precondensate having a relative viscosity $\leq 1.60$.

Advantageously, the starting material is an aqueous salt solution of 1,4-diaminobutane and adipic acid. Owing to the presence of excess 1,4-diaminobutane, the solution used advantageously has a pH of from 7.8 to 7.9 (at 20° C.). Suitable solutions contain for example from 40 to 65% by weight of the salt in question.

The polycondensation advantageously takes place at from 180° to 330° C. under superatmospheric pressure, for example at up to 100 bar, in particular at up to 40 bar. Advantageously, the bulk of the water is removed during the preparation of the precondensate, to leave a precondensate having a relative viscosity $\leq 1.60$, in particular from 1.4 to 1.60.

Of particular advantage is a process for producing the precondensate wherein, in a first stage, the aqueous salt solution is passed continuously into a vaporizer zone. There the aqueous salt solution is heated to 270°–330° C. under a superatmospheric pressure of from 1 to 10 bar with simultaneous vaporization of water and formation of a prepolymer. It is advantageous to employ a superatmospheric pressure of from 7 to 9 bar and to heat to a temperature of from 300° to 310° C. The stage is carried out with a residence tee of not more than 120 seconds, in particular from 70 to 100 seconds. A mixture is obtained, comprising a vapor phase and a molten prepolymer. Advantageously, the prepolymer has a degree of conversion $\geq 90\%$, in particular of from 94 to 96%.

The vaporizer zone is advantageously tubular, being constructed in particular as a tube bundle. An advantageous embodiment of the vaporizer zone comprises using tubes or tube bundles in which the individual tubes have internal fitments to create a large surface area. This is achieved for example by packing with Raschig rings, metal rings or in particular wire mesh packing.

The prepolymer and the vapor phase, which consist essentially of steam and small amounts of 1,4-diaminobutane and pyrrolidine, is passed at 270°–330° C. and 1–10 bar with mixing through an immediately adjoining mass transfer zone, fitted with internal fitments, in the course of a residence time of from 70 to 120 seconds to give a molten polymer and a vapor phase. Advantageously, the mass transfer zone, like the vaporizer zone, is constructed as a tube bundle. Internal fitments such as packing create a large surface area, for example of from 0.5 to 2 m²/l. This ensures that the phases, i.e. the prepolymer and the vapor, are brought into intimate contact.

The two-phase mixture of vapor and polymer emerging from the mass transfer zone is separated in a separating zone. The process of separation generally takes place automatically due to the physical differences, the polymer being collected in the bottom part of the separating zone and discharged in granulable form. The liberated vapors are likewise discharged and consist essentially of steam and small amounts of pyrrolidine.

The residence time of the molten polymer in the separating zone is advantageously less than 60 seconds, in particular from 30 to 45 seconds. It is very advantageous for the total residence time of the molten polymer in stages 1 to 3 to be less than 5 minutes, for example from 2.5 to 4 minutes. The polymer obtained generally has an amino end group content of from 150 to 400, in particular of from 115 to 300, meq/kg and a relative viscosity of from 1.40 to 1.55.

The vapor phase obtained in the separating zone is separated by distillation, the pyrrolidine is separated off and the 1,4-diaminobutane is recycled into stage a).

In stage b), the precondensate from stage a) is polycondensed in solid phase in the presence of steam at 220°–270° C. to obtain a nylon-4,6 having a relative viscosity of from 2.0 to 2.6.

The solid phase condensation is advantageously carried out with superheated steam. The solid phase condensation is advantageously performed by passing the nylon-4,6 precondensate downward through a zone, with superheated steam being passed upward. In general, from 4 to 5 hours are necessary to obtain a relative viscosity of from 2.0 to 2.6.

In stage c) reinforcing agents are incorporated into the nylon-4,6 having a relative viscosity of from 2.0 to 2.6 from stage b) in the molten state. In general, the reinforcing agent is used in an amount of from 10 to 60% by weight, in particular from 20 to 40% by weight, based on the sum total of reinforcing agent and nylon-4,6.

Suitable reinforcing agents are for example glass fibers, carbon fibers, potassium titanate whiskers, wollastonite, kaolin, calcium carbonate, talc and mica. It is advantageous to use kaolin, wollastonite or glass fibers. If glass fibers are used, preference is given to those which have been pretreated with an aminosilane and range from 5 to 20 μm, in particular from 8 to 15 μm, in diameter. The glass fibers are employed in the form of continuous or chopped filaments. After incorporation, the fiber length in the reinforced nylon should be from 100 to 500 μm, in particular from 180 to 350 μm, and the proportion of fibers above 800 μm should advantageously be below one percent by weight.

Pulverulent reinforcing agents or chopped fibers can be mixed with solid nylon-4,6 and then blended within an extruder with melting of the nylon, extruded in strand form, cooled and granulated. It is more advantageous first to melt the nylon-4,6 in the extruder and then to admix fibers or pulverulent fillers through a feed opening. The fibers undergo comminution in the course of the mixing in the extruder. It is advantageous to maintain an arithmetic mean fiber length of greater than 250 μm, in particular greater than 300 μm, and at the same time keep the proportion of fibers above 800 μm to less than 1%. Particular preference is given to glass fibers.

The reinforcing agents are advantageously incorporated in extruders, in particular twin-screw extruders. They are advantageously equipped with from 1 to 4 kneading blocks each with downstream damming elements, in particular left-handed threads.

In addition to the reinforcing agents it is possible to add additives such as flame retardants, for example red phosphorus, phosphorus compounds or antimony trioxide, or stabilizers in effective amounts.

In stage d), the reinforcing agent-filled nylon-4,6 from stage c) is polycondensed in solid phase in the presence of steam at 220°–270° C. to a relative viscosity of at least 3.2. Advantageously, the polycondensation is carried on to a relative viscosity of from 3.4 to 4.0. In general, the polycondensation is carried out with superheated steam and requires from 7 to 10 hours.

The nylon-4,6 obtainable by the process of the present invention, which is filled with a reinforcing agent, is advantageously suitable for producing injection or extrusion moldings.

The process of the present invention is illustrated by the following Examples. The determinations of relative viscosity given in the examples were made with 1% by weight solutions of the corresponding polyamide in 96% by weight of sulfuric acid at 25° C.

EXAMPLE 1

Equimolar amount of 1,4-diaminobutane and adipic acid are combined at 94° C. to prepare a 60% strength by weight aqueous salt solution of pH 7.8 and this solution is metered at a rate corresponding to a nylon quantity of 5 kg per hour into a verticle 3 m long vaporizer tube by means of a metering pump. The vaporizer has a capacity of 180 ml and consists of periodically alternating cylindrical and slotlike sections. The heat exchanger surface area is about 1400 cm$^2$. The tube is heated with a rapidly recirculating liquid heat transfer medium.

The residence tithe in the vaporizer is about 100 seconds, the temperature is 308° C. and the pressure is 8.0 bar. The mixture of molten prepolymer and vapor emerging from the vaporizer has a temperature of 305° C. and is passed directly into a mass transfer zone which is filled with packing and has a surface area of 1 m$^2$/l. The mass transfer zone is maintained at the same temperature and pressure as the vaporizer.

Within the mass transfer zone an intimate transfer takes place between the amine-containing gas phase and the condensing prepolymer. The residence time in this zone is about 95 seconds. The exit stream is a mixture of molten polymer and vapor, which is separated in a separating vessel into a vapor phase and a polymer phase. The polymer phase is immediately discharged. The residence time of the polymer in the molten state in the separating vessel is about 45 seconds. The total residence time in the molten state in the vaporizer zone, mass transfer zone and separating vessel is about 4 minutes.

The precondensate has a relative viscosity of 1.55 (component A1), an amino end group content of 290 mol equivalents per kg and a carboxyl end group content of 122 meq per kg. The pyrrolidine end group content is 0.1 mmol per g of polymer. The polymer obtained is white.

The vapors produced comprise steam, 0.9% by weight of pyrrolidine and about 8.0% by weight of 1,4-diaminobutane, and are passed at 303° C. and 8 bar into a column of 10 theoretical plates, where they are separated. At the top of the column about 900 ml per hour of water are introduced to augment the separating effect. The top column temperature is maintained at 175° C. The condensed vapors contain 0.85% by weight of pyrrolidine and <0.05% by weight of 1,4-diaminobutane. The bottom product of the column is an aqueous solution of 1,4-diaminobutane, which is replenished with 50% strength by weight aqueous 1,4-diaminobutane at a rate of 170 g per hour and passed into the vaporizer. Postcondensation I The granulated precondensate obtained is condensed in solid phase in countercurrent with super-heated steam at 260° C. and a course of residence time of 5 hours. A white polymer is obtained having a relative viscosity of 2.38 (component A2). Incorporation of reinforcing agent This polymer was admixed on a twin-screw extruder (ZSK 30 from Werner & Pfleiderer, 4 kneading blocks each with downstream damming element (left-handed thread), 250 rpm, 25 kg/h, 330") with glass fibers (30% by weight of OCFR23DX1 ®, chopped fiber 4.5 mm in length, 10 μm in diameter, aminosilane size). The mixture was extruded, cooled and granulated (component A3). Postcondensation II The nylon-4,6 thus obtained with a glass fiber content was heat treated with steam (260° C., 9 h) to a relative viscosity of 3.48 (component A4). The product was injection molded into specimens for testing. The results obtained are shown in the table below.

COMPARATIVE EXAMPLES 1–3

1. Component A1 was heat treated with steam (260° C., 14 h) directly to a relative viscosity of 3.54. Glass fibers were incorporated into this polymer as described in A, and the product was injection molded and tested.

2. Component A3 was injection molded without further heat treatment and tested.

3. Component A1 was subjected to an attempted compounding with glass fibers.

The results are shown in the table below.

The glass fiber content was 30% by weight in all Examples.

| | Example 1 | Comp. Ex. 1 | Comp. Ex. 2 | Comp. Ex. 3 |
|---|---|---|---|---|
| Fiber content (actual) [% by wt.] | 29.8 | 29.2 | 29.8 | —*) |
| Fiber length [μm] (arithmetic mean) | 338 | 245 | 338 | >480 |
| RV**) before compounding | 2.38 | 3.54 | 2.38 | 1.55 |
| RV after compounding | 2.14 | 2.52 | 2.14 | — |
| RV after heat treatment | 3.48 | — | — | — |
| Modulus of elasticity [MPa] (DIN 53 457) | 10524 | 9610 | 9924 | — |
| Tensile strength [MPa] (DIN 53 455) | 180.7 | 170.8 | 151.7 | — |
| Impact strength [kJ/m²] (DIN 53 453) | 42 | 33 | 19 | — |
| IZOD [kJ/m²] (ASTM) | 18 | 14 | 9 | — |
| Damaging energy, penetration test [J/m] (DIN 53 443) | 3.4 | 2.4 | 0.5 | — |

We claim:

1. A process for preparing nylon-4,6 filled with a reinforcing agent by mixing a reinforcing agent with nylon-4,6 in the melt, comprising the steps of
   a) polycondensing a salt of 1,4-diaminobutane and adipic acid in the presence of excess 1,4-diaminobutane and water at polyamide-forming temperatures under superatmospheric pressure to give a precondensate having a relative viscosity $\leq 1.60$,
   b) polycondensing the precondensate of a) in solid phase in the presence of steam at 220°–270° C. to obtain a nylon-4,6 having a relative viscosity of from 2.0 to 2.6,
   c) incorporating a reinforcing agent in the melt into nylon-4,6 from stage b) to obtain a nylon-4,6 filled with a reinforcing agent,
   d) polycondensing said filled nylon-4,6 in solid phase in the presence of steam at 220°–270° C. to a relative viscosity of at least 3.2.

2. A process as claimed in claim 1, wherein the polycondensation in stage a) is carried out at 270°–330° C. and 1–10 bar in less than 5 minutes with formation of a vapor phase.

3. A process as claimed in claim 1, wherein superheated steam is used in stages b) and d).

4. A process as claimed in claim 1, wherein the reinforcing agent used in stage c) is glass fiber.

5. A process as claimed in claim 1, wherein the arithmetic mean of the glass fiber length distribution is maintained at greater than 250 μm and at the same time the proportion of fibers over 800 μm in length is maintained at less than 1%.

6. A process as claimed in claim 1, wherein the arithmetic mean of the glass fiber distribution is maintained at greater than 300 μm and at the same time the proportion of fibers over 800 μm in length is maintained at less than 1%.

* * * * *